Feb. 19, 1952 G. E. BAXTER 2,585,911
METHOD OF MAKING VINYL CHLORIDE
Filed Aug. 10, 1948
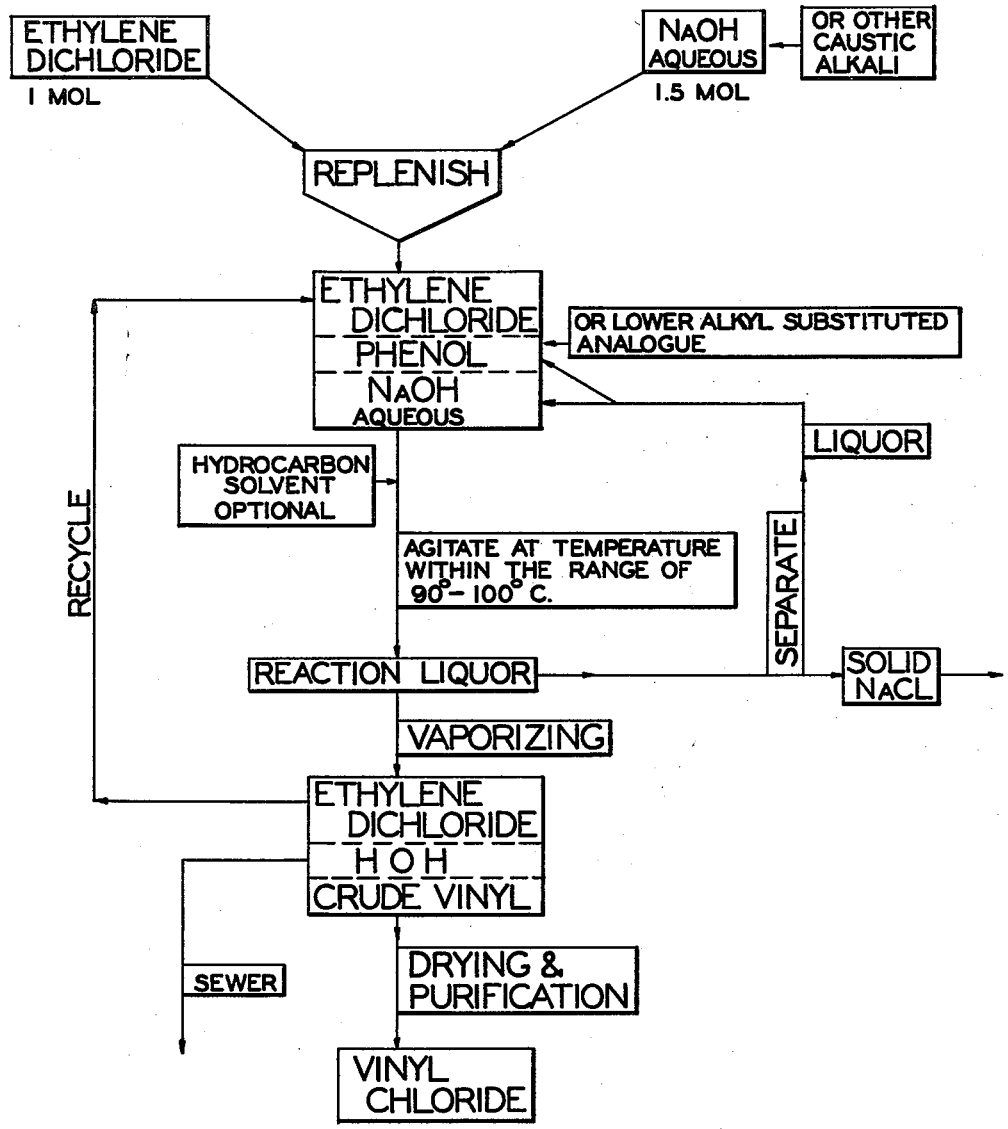
INVENTOR
GEORGE E. BAXTER Patented Feb. 19, 1952

2,585,911

UNITED STATES PATENT OFFICE 2,585,911

METHOD OF MAKING VINYL CHLORIDE

George E. Baxter, Grand River, Ohio, assignor to Diamond Alkali Company, Cleveland, Ohio, a corporation of Delaware Application August 10, 1948, Serial No. 43,443

10 Claims. (Cl. 260—656)

This invention relates to the production of vinyl chloride by chemical dehydrochlorination of ethylene dichloride, and more particularly relates to a continuous process for obtaining vinyl chloride in which high yields of vinyl chloride are obtained and in which certain of the raw materials used in the dehydrochlorination reaction, and by-products therefrom, may suitably be recovered and recycled in the process.

The obtaining of vinyl chloride by chemical dehydrochlorination of ethylene dichloride with aqueous caustic alkali is well-known and has heretofore been relatively widely practiced in the chemical arts. The dehydrochlorination reaction, however, is subject to difficulties in its accomplishment and has been found by prior investigators to result in substantial quantities of undesired secondary products, whereby the yield of the primary product, vinyl chloride, is adversely affected. Thus, prior investigators have found it necessary to use substantial quantities of mono- or dihydroxy alcohols as caustic alkali carriers in effecting the dehydrochlorination reaction. The mono- or dihydroxy alcohols appear to have a twofold function in the reaction in that they tend to increase the miscibility of the ethylene dichloride in the aqueous caustic alkali, and apparently to react to some degree with the aqueous caustic alkali, the product of which reaction is believed to accelerate the dehydrochlorination of the ethylene dichloride. Thus, it appears that the action of these substances in conjunction with the aqueous caustic alkali is somewhat analogous to a catalytic effect.

One of the difficulties encountered in using the mono- or dihydroxy alcohols arises in that the products of the dehydrochlorination reaction react with aqueous caustic alkali to form water, which must be removed from the reaction zone effectively and substantially continuously, or there results an undesirable amount of dilution of the aqueous caustic alkali, whereby the reaction rate is materially retarded, and only uneconomical amounts of the desired vinyl chloride are produced in a given time.

When the water formed in the dehydrochlorination of ethylene dichloride with caustic alkali is removed from the reaction zone by distillation, the mono- or dihydroxy alcohols are removed therewith, in accordance with the natural tendency of these substances to form azeotropes, and the laws of physical chemistry applicable thereto. When such azeotropic mixtures are subsequently subjected to distillation to recover the alcohol constituents thereof, there are substantial losses of such alcohols because of the affinity of these substances for water, and because of the large volume of water which must be disposed of relative to the volume of mono-, or dihydroxy alcohols, which is employed initially as caustic alkali carrier in the dehydrochlorination reaction. For, although the alcohol which is recovered is sufficiently free from water to be returned to the reaction zone without deleterious effect upon the reaction taking place therein, the large volumes of water discarded carry with them appreciable quantities of the alcohol substance which must be replaced from outside sources, since these substances are not formed, to any appreciable extent, in the dehydrochlorination reaction. It is to the solution of the problem of losses of caustic alkali carrier substance to which the method of the present invention is particularly directed.

The present invention has as one of its objects the avoidance of the various disadvantages and inefficiencies of the prior art methods, and has as a further object the provision of an efficient, continuous operation which, though it employs relatively impure reactants throughout, results in high yields of vinyl chloride of high purity, and in which the reactants may be efficiently recycled to obtain a maximum yield of vinyl chloride at a very low raw material cost.

In fulfilling these objects, the present invention contemplates employing a caustic alkali carrier substance in the dehydrochlorination of ethylene dichloride, which substance functions as a dehydrochlorination catalyst and caustic alkali carrier in an alkaline aqueous medium, and does not exist therein in a form which is volatile with water vapor, under the conditions existing in the reaction zone; hence, there is very little, if any, of the caustic alkali carrier-dehydrochlorination catalyst material lost and a definite economic advantage thereby obtains.

The attached drawing is a chemical process flow-sheet primarily illustrating one embodiment of the method of the present invention, and secondarily indicating certain equivalents which may be used therein. Therefore, it will be advantageous for those skilled in the art frequently to refer to the attached drawing as the detailed description of the present invention proceeds herefrom.

The present invention particularly envisions a method of dehydrochlorinating ethylene dichloride by reaction of said ethylene dichloride with an aqueous solution of caustic alkali, which includes conducting the dehydrochlorination reaction in a fluid body comprising an alkali metal salt of a hydroxy aromatic hydrocarbon selected from the group consisting of hydroxy benzene and its lower alkyl substituted analogues. The reaction is preferably performed in the presence of excess aqueous caustic alkali, the amount of said aqueous caustic alkali being in excess of that required to react with the hydroxy aromatic hydrocarbon compound to form said alkali metal salt thereof.

More particularly, in accordance with the present invention, aqueous caustic alkali, which may be commercial relatively impure caustic soda solution, such as an electrolytic caustic solution obtained from commercial electrolysis operations and, if desired, concentrated to a suitable concentration, is combined in a reactor with a hydroxy aromatic hydrocarbon compound selected from the group noted hereinabove, the concentration of the aqueous caustic alkali being such that there is a stoichiometrical excess of the caustic alkali over the amount required to react with the hydroxy aromatic compound to form the alkali metal salt thereof. It has been found desirable in the practice of the present invention initially to provide, in the reaction zone, a caustic soda solution having a concentration of at least 30% of sodium hydroxide by weight, suitably from 40% to 60%, preferably about 50%, and subsequently to replenish the caustic soda substantially at the rate at which it becomes depleted by supplying thereto unrefined, caustic alkali containing cell liquor from the electrolysis of brine as it is obtained from commercial operations for producing caustic soda and chlorine, which liquor normally contains approximately 115 to 130 gms. per liter NaOH, and approximately 145 to 160 gms. per liter NaCl.

Of the particular group of hydroxy aromatic hydrocarbon compounds which may be used in the practice of the present invention, the monohydric compounds such as ordinary phenol (hydroxy-benzene) and the cresols are preferred for reasons of economy. Phenol is especially useful in the method of the present invention because of its ready availability, reactivity with caustic alkali in aqueous solution, but otherwise chemically inert character, especially its inertness to atmospheric oxygen under the reaction conditions employed herein. However, others of the lower alkyl substituted phenols may be used in the method of the present invention with substantially equal effectiveness. Examples of these are the o-, m-, and p-, ethyl, propyl, or butyl phenols, the xylenols (dimethyl derivatives of phenols), guiacol (o-methoxy derivatives), and the like. Because of the extremely small losses of the phenolic compounds by distillation, initial cost of the phenolic material used herein is not of paramount importance, since this material may be reused substantially indefinitely. Various ratios of the aqueous caustic alkali to the phenolic compound greater than 1:1 may be used in the practice of the present invention, but it has been found preferable to employ a ratio within the range of one and one-half moles of the caustic alkali to one mole of the phenolic compound and 3.5 moles of the caustic alkali to one of the phenolic compound.

In order to remove the water formed by the reactions of dehydrochlorination and neutralization from the reaction zone, it has been found suitable, when operating according to one embodiment of the present invention, to conduct the reaction at a temperature somewhat above the boiling point of water, i. e. above 100° C., but not substantially above 120° C. If desired, however, the reaction may be conducted at a temperature substantially less than 100° C. by employing, in addition to the hydroxy aromatic compound, a hydrocarbon material which will form an azeotrope with water and any unreacted ethylene dichloride in the reaction zone, and in addition, will readily dissolve ethylene dichloride and be dispersed in the aqueous mixture of caustic alkali and alkali metal phenolate. It is preferred to employ a hydrocarbon material having a boiling point between 80° and 250° C. and which gives an azeotrope having a minimum boiling point substantially less than that of water. As examples of such hydrocarbons suitable in the practice of the present invention may be mentioned substances such as a kerosene having an average molecular weight corresponding to a $C_{11}$ to $C_{14}$ substantially saturated aliphatic hydrocarbon, or a hydrocarbon of the aromatic type such as benzene, xylene, or toluene. Where hydrocarbons such as those mentioned above are used in the method of the present invention to aid in the rate of removal of water from the reaction zone by azeotrope formation, it is preferred, in carrying out this embodiment of the method of the present invention, to control the rate of addition of the ethylene dichloride to the heated fluid body of reactants in the reaction zone, to the end that the solution of unreacted ethylene dichloride in the hydrocarbon material condensed from the azeotrope will have a specific gravity substantially different from, i. e. greater or less than, that of water. When the amount of ethylene dichloride is controlled as set forth above, subsequent separation of the solution of ethylene dichloride in the hydrocarbon material from the water of the condensed azeotrope is readily effected by gravity and the recovered ethylene dichloride may be recycled to the reaction zone for further contact with the caustic alkali and alkali metal phenolate therein, thereby to produce further quantities of vinyl chloride.

In the practice of the method of the present invention, with or without the aid of an azeotrope forming inert hydrocarbon material to aid the rate of removal of the water of reaction from the reaction zone, recovered unreacted ethylene dichloride is separated from the water distilling therewith from the reaction zone and recycled to the reaction zone for further contact with the caustic alkali and alkali metal phenolate therein, thereby to produce further quantities of vinyl chloride.

Inasmuch as the dehydrochlorination reaction with caustic alkali involves the formation of an alkali metal chloride, which salt under the reaction conditions is initially dissolved in the reaction liquors and subsequently, when a sufficient amount thereof has accumulated, is precipitated from solution in solid form, vigorous agitation is provided in the reaction zone in order that such precipitated alkali metal salt be held in suspension. Preferably the so-precipitated salt is permitted to remain in the reaction vessel for a relatively short time and may suitably be removed continuously or intermittently from the reaction zone and separated from the reaction liquors by centrifuging, or by filtration, and washing. It may thereafter be dissolved in water and returned, if desired, to the electrolytic cells producing caustic alkali and chlorine from brine.

A further advantage obtains from the method of the present invention in that, in the presence of the alkali metal salt of a hydroxy aromatic compound selected from the class described hereinabove, with or without the high boiling hydrocarbon material used to aid the removal of water from the reaction zone, ethylene dichloride is well dispersed in the reaction liquors and hence, there is thereby obtained a large surface area of ethylene dichloride in contact with the alkaline hydrogen chloride-sequestering liquors in the reaction zone.

In order that the invention may be better understood by those skilled in the art and in order that more fully detailed methods of its actual practice may be disclosed, the following specific examples are offered.

Example I

The following ingredients are charged to a cylindrical nickel reactor: 5.3 mols of phenol, 6.25 mols of ethylene dichloride, and 15 mols of NaOH (commercial 50% liquor).

The reactor is fitted with an agitator, a vapor take-off line leading from the uppermost portion of the reactor to a water-cooled condenser, and a liquid take-off line leading from the lowermost portion of the reactor to a liquid-solid separator. A liquid return line is provided from the liquid-solid separator to the reactor. The vapor take-off enters the water-cooled condenser at the top thereof, the vapors from the reactor being conducted downwardly therethrough. A take-off line leads from the bottom of the water-cooled condenser to a liquid-vapor separator having a vapor take-off leading through a second water-cooled condenser and thence to a low temperature condenser, and a liquid take-off line leading to a two-phase liquid-liquid separator. From the liquid-liquid separator, one take-off line, for ethylene dichloride, or solution thereof, leads to the reactor, and the other, for water, leads to a sewer. The low temperature condenser is connected to a suitable receiver for the product vinyl chloride. A proportioning pump is provided for further addition of aqueous caustic soda and ethylene dichloride through lines leading from the pump to the reactor, the separate lines entering a common conduit, which conduit has its outlet beneath the surface of the liquid charge contained in the reactor.

The contents of the reactor are vigorously agitated, while heating to 100° C. Agitation of the reactants is thereafter maintained while the temperature thereof is so regulated that it remains within the range of 100–110° C. The volume of the reactants within the reactor is controlled by coordinating the rate of distillation of water from the reaction zone with the volume of recycled materials from the liquid-liquid and the liquid-solid separators, and the delivery of make-up caustic soda and ethylene dichloride from the proportioning pump. Make-up aqueous 50% caustic soda solution and ethylene dichloride are added as required, by means of the proportioning pump, in the ratio of 1.5 mols of NaOH to 1 mol of ethylene dichloride, to replenish the ethylene dichloride and caustic soda which have entered into the dehydrochlorination and neutralization reactions and to maintain a ratio of caustic soda to phenol sufficient to preclude the formation of appreciable quantities of free phenol.

10 mols of vinyl chloride are recovered at the end of the reaction period from the low temperature condenser, the unreacted ethylene dichloride, in the system, and from the reaction liquors representing in all a theoretical yield of the order of 84%, based on the amount of ethylene dichloride reacted. Less than 2% by weight of the original charge of phenol is lost during the reaction period.

Example II

The following ingredients in the amounts given are charged to the reactor of the apparatus described in Example I: 200 parts of phenol, 431 parts of xylol, 628 parts of ethylene dichloride, and 600 parts of caustic soda liquor containing 50% NaOH. The apparatus is set up as described in Example I and substantially the same operating technique is employed, with the exception that from the liquid-liquid separator, a solution of ethylene dichloride in xylol is returned to the reactor. The caustic soda solution, which is used to replenish that which entered into the dehydrochlorination and neutralization reactions, is supplied from an unrefined grade of caustic soda liquor obtained directly from electrolytic cells used to produce caustic soda and chlorine by the electrolysis of brine, which liquor contains 132 gms. per liter of NaOH and 160 gms. per liter of NaCl. At the end of the reaction, 887 parts of vinyl chloride are collected, representing 81% of the theoretical amount based upon the amount of ethylene dichloride reacted.

Example III

Using the same apparatus as that described in Example I and employing substantially the same operating techniques as those set forth in Example II, the following ingredients in the amounts given are charged to the reactor: 200 parts of phenol, 400 parts of kerosene (average mol. wt. corresponds to a $C_{12}$ aliphatic hydrocarbon), 600 parts of caustic soda liquor (50% NaOH), and 628 parts of ethylene dichloride.

At the end of the reaction period, the amount of vinyl chloride recovered corresponds to an efficiency comparable to that given in Examples I and II, based on the weight of the ethylene dichloride reacted.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the method of preparing vinyl chloride by the dehydrochlorination of ethylene dichloride with aqueous caustic alkali, the improvement which comprises carrying out said dehydrochlorination in a fluid body comprising an aqueous solution of caustic alkali and an alkali metal salt of a hydroxy aromatic compound selected from the group consisting of hydroxy-benzene, and its nuclear lower alkyl substituted derivatives.

2. In the method of preparing vinyl chloride by the dehydrochlorination of ethylene dichloride with aqueous caustic alkali, the improvement which comprises carrying out said dehydrochlorination in a fluid body comprising an aqueous solution of caustic alkali and an alkali metal salt of a hydroxy aromatic compound selected from the group consisting of hydroxy-benzene, and its nuclear lower aliphatic substituted derivatives, while maintaining the molar ratio of caustic alkali to said hydroxy aromatic compound in said fluid body at more than 1:1.

3. In the method of preparing vinyl chloride by the dehydrochlorination of ethylene dichloride with aqueous caustic alkali, the improvement which comprises carrying out said dehydrochlorination in a fluid body comprising aqueous caustic alkali, an alkali metal salt of a hydroxy aromatic compound selected from the group consisting of hydroxy-benzene and its nuclear lower aliphatic substituted derivatives, and a hydrocarbon selected from the group consisting of aromatic and aliphatic hydrocarbons whose boiling points fall within the range of 80–250° C.

4. In the method of preparing vinyl chloride by the dehydrochlorination of ethylene dichloride with aqueous caustic alkali, the improvement which comprises carrying out said dehydrochlorination in a fluid body comprising an aqueous solution of caustic alkali and an alkali metal salt of phenol, while maintaining a molar ratio of caustic alkali to said phenol in said fluid body greater than 1:1.

5. In the method of preparing vinyl chloride by the dehydrochlorination of ethylene dichloride with aqueous caustic alkali, the improvement which comprises carrying out said dehydrochlorination in a fluid body comprising an aqueous solution of caustic alkali and an alkali metal salt of cresol, while maintaining a molar ratio of caustic alkali to said cresol in said fluid body greater than 1:1.

6. In the method of preparing vinyl chloride by the dehydrochlorination of ethylene dichloride with aqueous caustic alkali, the improvement which comprises carrying out said dehydrochlorination in a fluid body comprising aqeos caustic alkali, an alkali metal salt of a hydroxy aromatic compound selected from the group consisting of hydroxy-benzene, and its nuclear lower aliphatic substituted derivatives, and xylene.

7. In the method of preparing vinyl chloride by the dehydrochlorination of ethylene dichloride with aqueous caustic alkali, the improvement which comprises carrying out said dehydrochlorination in a fluid body comprising aqueous caustic alkali, an alkali metal salt of a hydroxy aromatic compound selected from the group consisting of hydroxy-benzene, and its nuclear lower aliphatic substituted derivatives, and substantially completely saturated aliphatic petroleum hydrocarbon having an average molecular weight corresponding to a saturated hydrocarbon having from 11 to 14 carbon atoms.

8. In the method of preparing vinyl chloride by the dehydrochlorination of ethylene dichloride with aqueous caustic alkali, the improvement which comprises carrying out said dehydrochlorination in a fluid body comprising an aqueous solution of caustic alkali and an alkali metal salt of phenol and xylene, while maintaining a molar ratio of caustic alkali to said phenol in said fluid body between 1.5:1 and 3.5:1.

9. In the method of preparing vinyl chloride by the dehydrochlorination of ethylene dichloride with aqueous caustic alkali, the improvement which comprises carrying out said dehydrochlorination in a fluid body comprising an aqueous solution of caustic alkali and an alkali metal salt of phenol and xylene, while maintaining a molar ratio of caustic alkali to said phenol in said fluid body between 1.5:1 and 3.5:1, and conducting the reaction at a temperature within the range of 90–125° C.

10. In the method of preparing vinyl chloride by the dehydrochlorination of ethylene dichloride with aqueous caustic alkali, the improvement which comprises carrying out said dehydrochlorination in a fluid body comprising aqueous caustic alkali, an alkali metal salt of a hydroxy aromatic compound selected from the group consisting of hydroxy-benzene, and its nuclear lower aliphatic substituted derivatives, and substantially completely saturated aliphatic petroleum hydrocarbon having an average molecular weight corresponding to a saturated hydrocarbon having from 11 to 14 carbon atoms, and conducting the reaction at a temperature within the range of 90–125° C.

GEORGE E. BAXTER.

REFERENCES CITED

The following references are of record in the file of this patent:

UNITED STATES PATENTS

| Number | Name | Date |
|---|---|---|
| 2,041,814 | Brous | May 26, 1936 |
| 2,322,258 | Strosacker | June 22, 1943 |

FOREIGN PATENTS

| Number | Country | Date |
|---|---|---|
| 569,291 | Great Britain | May 16, 1945 |
| 590,324 | Great Britain | July 15, 1947 |